(12) United States Patent
Bao et al.

(10) Patent No.: US 11,262,038 B2
(45) Date of Patent: Mar. 1, 2022

(54) LIGHTING APPARATUS WITH EMERGENCY LIGHT MODULE AND INTERFACE

(71) Applicant: XIAMEN LEEDARSON LIGHTING CO.,LTD, Fujian (CN)

(72) Inventors: Jianfeng Bao, Fujian (CN); Lei Zhang, Fujian (CN); Tong Luo, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/023,130

(22) Filed: Sep. 16, 2020

(65) Prior Publication Data
US 2021/0080069 A1    Mar. 18, 2021

(30) Foreign Application Priority Data

Sep. 16, 2019 (CN) .......................... 201921535333.9

(51) Int. Cl.
| F21S 9/00 | (2006.01) |
| F21S 9/02 | (2006.01) |
| F21V 23/00 | (2015.01) |
| F21V 23/06 | (2006.01) |
| F21V 8/00 | (2006.01) |
| F21V 23/04 | (2006.01) |
| F21Y 113/10 | (2016.01) |
| F21Y 115/10 | (2016.01) |

(52) U.S. Cl.
CPC ............ *F21S 9/022* (2013.01); *F21V 23/007* (2013.01); *F21V 23/0435* (2013.01); *F21V 23/06* (2013.01); *G02B 6/0011* (2013.01); *F21Y 2113/10* (2016.08); *F21Y 2115/10* (2016.08)

(58) Field of Classification Search
CPC ...... F21V 23/009; F21V 15/01; F21V 23/007; F21V 23/003; F21S 9/022; F21S 9/024; F21S 9/02; F21Y 2113/10; F21Y 2115/10
See application file for complete search history.

(56) References Cited

U.S. PATENT DOCUMENTS

| 6,929,376 B2* | 8/2005 | Harris ...................... F21S 9/022 362/20 |
| 7,036,961 B2* | 5/2006 | Defouw ................. F21V 23/026 362/364 |
| 8,029,151 B2* | 10/2011 | Butler ................... F21V 29/507 362/20 |
| 8,106,532 B2* | 1/2012 | Chen ......................... H02J 9/06 307/66 |
| 8,360,620 B1* | 1/2013 | Rashidi ................... F21V 15/01 362/364 |
| 8,439,519 B2* | 5/2013 | Yang ..................... G02B 6/0068 362/231 |
| 8,896,208 B2* | 11/2014 | Shew ..................... H05B 47/11 315/88 |

(Continued)

*Primary Examiner* — Ismael Negron
(74) *Attorney, Agent, or Firm* — Chun-Ming Shih; Lanway IPR Services (57) ABSTRACT

A lighting apparatus includes a first light source, a light housing with an opening for light from the first light source and configured to convert external power to a driving current for the first light source, an emergency light module configured to provide emergency light, and a function interface disposed on the housing for selectively activating the emergency module under an emergency condition.

17 Claims, 8 Drawing Sheets

(56) References Cited

U.S. PATENT DOCUMENTS

| | | | | |
|---|---|---|---|---|
| 9,506,612 | B1* | 11/2016 | Badley | F21S 9/024 |
| 2004/0051466 | A1* | 3/2004 | Liu | H05B 41/38 |
| | | | | 315/149 |
| 2010/0290207 | A1* | 11/2010 | Chan | F21V 15/01 |
| | | | | 362/20 |
| 2013/0106294 | A1* | 5/2013 | Rakuff | F21V 23/0457 |
| | | | | 315/154 |
| 2014/0240966 | A1* | 8/2014 | Garcia | F21S 9/024 |
| | | | | 362/183 |
| 2014/0268697 | A1* | 9/2014 | Smith | F21V 23/0435 |
| | | | | 362/183 |

* cited by examiner

LIGHTING APPARATUS WITH EMERGENCY LIGHT MODULE AND INTERFACE

FIELD

The present invention is related to a lighting apparatus, and more particularly related to a lighting apparatus with an extension mode.

BACKGROUND

Sometimes, there may be accidents like typhoons, fire or earthquakes. In such cases, electricity supply may be stopped and a room originally with light is filled with darkness.

To prevent such situation and keep people safe, emergency light are provided to turn on an emergency light when necessary. However, such device needs a space to be installed and may needs cost on wiring for the emergency light.

Therefore, it is beneficial to invent a new way to provide emergency light in a more flexible and convenient way while controlling the overall cost.

SUMMARY

In some embodiments, a lighting apparatus includes a first light source, a light housing, a driver, and a function interface.

The light housing is used for disposing the first light source.

The light housing has a light opening for a light of the first light source to pass through.

The driver has a driver box and a driver circuit.

The driver box is attached to the light housing.

The driver circuit is connected to an external power and converts the external power to a driving current supplied to the first light source.

The function interface is disposed on the light housing for detachably connecting to an emergency light module for providing an emergency light under an emergency condition.

The lighting apparatus may be a panel light device, a light bulb, a downlight, a ceiling light, a spot light or other light devices.

In the case that the lighting apparatus is a panel light device, there may be a light guide plate for guiding the light of the first light source to enter from a lateral side of the light guide plate and escape from multiple tiny dots disposed on a flat surface of the light guide plate to generate a soft surface illumination.

In some other embodiments, the first light source may include multiple LED modules. Each LED module has a diffusion lens for changing light path by diffusing the light of the LED module.

The driver box may be connected to the first light source via a connecting wire, or be disposed directly on a back cover of the light housing of the lighting apparatus.

The light housing may include one or more metal and/or plastic components for holding components of the lighting apparatus. Depending on different types of the lighting apparatus, the light housing have different shapes.

The function interface may include a structure connector and an electrical connector. The structure connector is used for disposing and fixing the emergency light module. The electrical connector is used for connecting electricity of components in the emergency light module.

In some embodiments, the emergency light module has its own second LED module with power supply directly from a battery of the emergency light module.

In some embodiments, the electrical connector is connected to the driver circuit in the driver box.

The cooperation between the driver circuit and the components like another power driver and/or a battery has several options depending on different design needs.

For example, the emergency light module only has a battery which is electrically connected to the driver circuit. In such case, the charging and discharging or power supply of the battery is controlled by the driver circuit. When there is no external power source supplied, the battery supplies power for the driver circuit to operate.

In some other embodiments, the emergency light module has its own power circuit also directly connected to the external power source and may be operated independent from the driver circuit and the first light source.

In some other embodiments, the emergency light module may have other ways to work with the first light source and some examples are provided in more detail in following description.

The emergency condition may be configured to associate for an accident stop of the external power, e.g. an indoor 110V/220V power supply.

In some embodiments, the function interface has a socket and a holder.

The holder is for holding a detachable battery module electrically plugged to the socket for supplying power to emit the emergency light.

The socket may be a common interface for receiving power supply. For example, USB interface is convenient for receiving power from a portable battery module, which is commonly seen and used in daily life for charging mobile phones.

With such socket, like USB interface and a holder, when emergency case like earthquake occurs, users may plug their portable battery module to the socket and place the portable battery module in the holder to provide temporary illumination.

In some embodiments, the lighting apparatus may also include a manual switch for selecting an emergency mode from multiple candidate emergency modes.

The multiple candidate emergency modes are corresponding to different time periods and light intensities of the emergency light.

There are various scenarios for an accident that needs emergency light. In some cases, the external power supply is expected to be quickly recovered while in some other cases, users may wait for quite a long time in a dark room if the emergency light is not available.

There is a manual switch to be operated by the user to select from multiple options. Each option is associated with a different light intensity and/or expected time period length for using the emergency light.

The circuit of the emergency light supply detects the status of the manual switch and determines a corresponding light intensity of the emergency light.

For example, when the time period is expected for 4 hours, the circuit calculates the estimated time period of the battery to supply an emergency light trying to be close to 4 hours. The light intensity is different from the option for 1 hour.

In some embodiments, the emergency light module includes a second LED module with a different color temperature as a first LED module of the first light source.

The driver circuit uses the second LED module and the first LED module to mix a mixed light not in the emergence condition.

When the emergency light module includes an additional LED module, the additional LED module may be operated together with the first light source to generate a more flexible light output, e.g. to mix a desired color temperature.

In other words, even not in the emergency condition, the second LED module of the emergency light module may still be used for providing common light output or even enhance the light output.

In some embodiments, the function interface has a rotatable container for containing the emergency light module.

The rotatable container is rotated to insert the emergency light module.

Specifically, the lighting apparatus may have a rotatable box. The rotatable box has an entrance for inserting the emergency light module and kept not seen by people, e.g. placed upwardly toward the ceiling.

When users want to insert the emergency light module, users rotate the rotatable container, exposing the entrance downwardly and insert the detachable emergency light module.

After the emergency light module is inserted, the rotatable container is rotated back to its original position to keep the overall look of the lighting apparatus clean and elegant.

In some embodiments, the light housing has a frame, a back cover and a light passing cover.

The frame connects the back cover and the light passing forming a container space for enclosing the first light source.

The driver box is attached on the back cover.

In some embodiments, the lighting apparatus is a panel light device.

The panel light device has a frame. If the panel light device is a circular light shape, the frame is a circular wall. If the panel light is rectangular light shape, the frame has four lateral walls.

There is a back cover and a light passing cover connected to the frame on two sides forming a container space for disposing the first light source.

The light of the first light source is emitted passing through the light passing cover.

The driver box is attached on the back cover.

In some embodiments, the lighting apparatus may also include a light guide plate for receiving and guiding the light of the first light source to pass through the light guide plate.

A second LED module of the emergency light module emits the emergency light is also guided and passes through the light guide plate.

The light guide plate may be made of transparent material with a lateral wall as light entrance and a flat surface with a lot of micro structures where light escape from.

By using a light guide plate, a soft surface illumination is obtained.

The second LED module also uses the same light guide plate to change output light paths.

In some embodiments, the light housing has an entrance slot for inserting the second LED module of the emergency light module to align with a second light entrance position of the light guide plate.

In such example, the emergency light module has the second LED module.

The second LED module may be made as a module together with an emergency driver box. In some other cases, the second LED module is made as a detachable component from the emergency driver box.

The second LED module may be inserted into the light housing just like the first light source. When there is a light guide plate, the second LED module is aligned with the light entrance of the light guide plate.

In some embodiments, the first light source is aligned with a first light entrance position of the light guide plate.

The first light entrance position and the second light entrance position are located at different lateral sides of the light guide plate.

In some embodiments, the emergency light module includes an emergency power circuit supplying power to the first light source to emit the emergency light in the emergency condition.

In some embodiments, the first light source includes a first LED module emitting light not in the emergency condition and includes a second LED module used for generating the emergency light.

In some embodiments, the function interface includes a fixing structure for detachably fixing an emergency box of the emergency light module.

For example, a groove, a slot, a block, an ear structure with screws may be used as such fixing structure.

In some embodiments, a battery in the emergency box is electrically connected to the driver circuit when the emergency box is fixed to the fixing structure of the function interface.

In some embodiments, a concealing cover is used for covering a function slot of the function interface when the emergency module is not installed.

Such concealing cover may keep the appearance of the lighting apparatus elegant and prevent dust to enter the light housing.

In some embodiments, the concealing cover is open for inserting a second LED module into the light housing.

The second LED module has a first plugging structure for detachably connecting to a corresponding second plugging structure of the emergency box.

In some embodiments, the driver circuit controls a battery of the emergency light module to supply power to emit the emergency light in a discharging mode to discharge and test the battery to keep the battery in healthy condition.

The discharging mode is not in the emergency condition.

In some embodiments, the driver circuit controls a light intensity of the first light source so that a final light outputs from the light opening are substantially the same in the discharging mode and in a normal mode.

The normal mode is not the discharging mode and not in the emergency condition.

In some embodiments, the emergency light module has a power circuit electrically connected to the external power directly without passing via the driver circuit, and is automatically activated to emit the emergency light when the external power is not supplied.

In some embodiments, the function interface is detachably connected to a wireless module for receiving an external command from an external device to control the driver circuit.

In some embodiments, the function interface is detachably connected to a speaker module, the driver circuit supplies power to the speaker module to generate a sound.

In some embodiments, the first light source has an indicator for showing a battery status of the emergency light module when not in the emergency mode.

DETAILED DESCRIPTION

Figure 8:
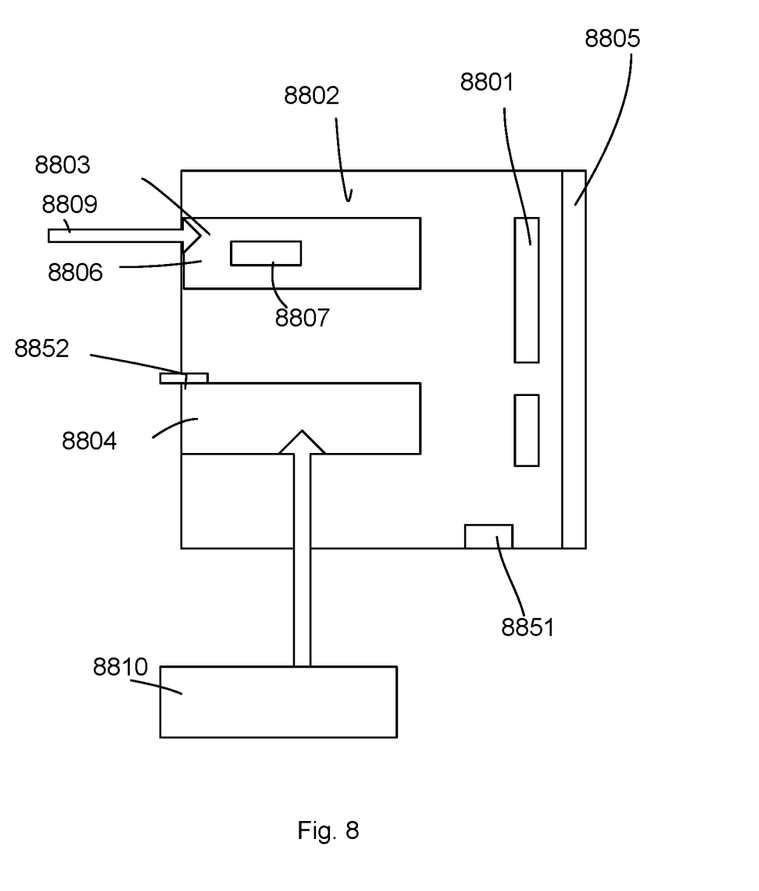
FIG. 8 shows an embodiment of a lighting apparatus.

In FIG. 8, a lighting apparatus includes a first light source 8801, a light housing 8802, a driver 8803, and a function interface 8804.

The light housing 8802 is used for disposing the first light source 8801.

The light housing 8802 has a light opening 8805 for a light of the first light source 8801 to pass through.

The driver 8803 has a driver box and a driver circuit.

The driver box 8806 is attached to the light housing 8802.

The driver circuit 8807 is connected to an external power 8809 and converts the external power to a driving current supplied to the first light source 8801.

The function interface 8804 is disposed on the light housing 8802 for detachably connecting to an emergency light module 8810 for providing an emergency light under an emergency condition.

The lighting apparatus may be a panel light device, a light bulb, a downlight, a ceiling light, a spot light or other light devices.

Figure 9:
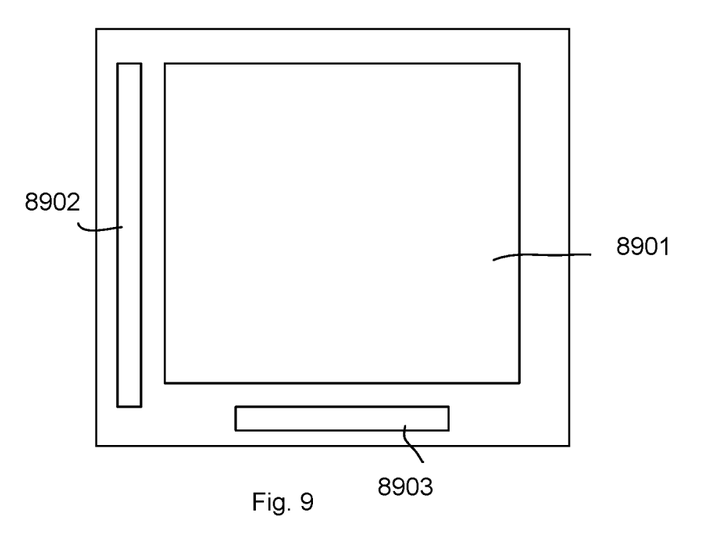
FIG. 9 shows a first type of a panel light device.

In FIG. 9, the lighting apparatus is a panel light device. There is a light guide plate 8901 for guiding the light of the first light source 8902 to enter from a lateral side of the light guide plate and escape from multiple tiny dots disposed on a flat surface of the light guide plate to generate a soft surface illumination. The emergency light module has a second LED module 8903 also inserted into the lighting apparatus and uses the same light guide plate 8901.

Figure 10:
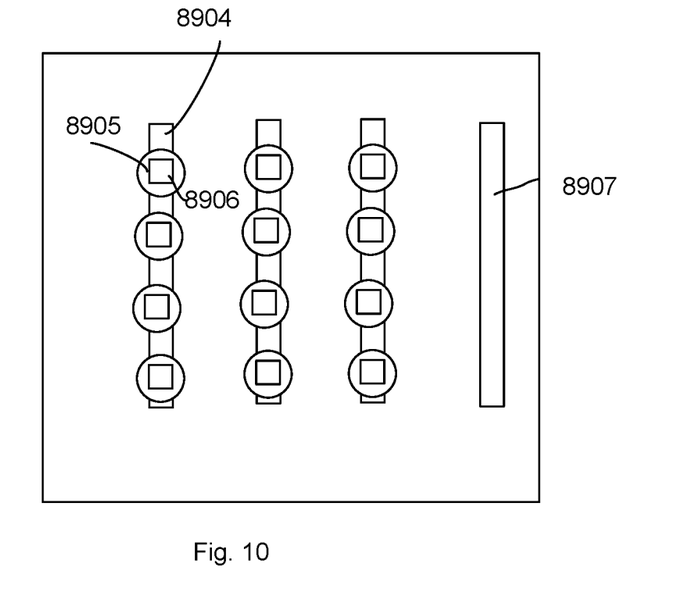
FIG. 10 shows another type of a panel light device.

In FIG. 10, the first light source may include multiple LED modules 8904. Each LED module 8906 has a diffusion lens 8905 for changing light path by diffusing the light of the LED module. The second LED module 8907 may be inserted into the light housing. In some embodiments, the emergency light module also uses the first light source to emit the emergency light.

The driver box may be connected to the first light source via a connecting wire, or be disposed directly on a back cover of the light housing of the lighting apparatus.

The light housing may include one or more metal and/or plastic components for holding components of the lighting apparatus. Depending on different types of the lighting apparatus, the light housing has different shapes.

The function interface may include a structure connector and an electrical connector. The structure connector is used for disposing and fixing the emergency light module. The electrical connector is used for connecting electricity of components in the emergency light module.

Figure 1:
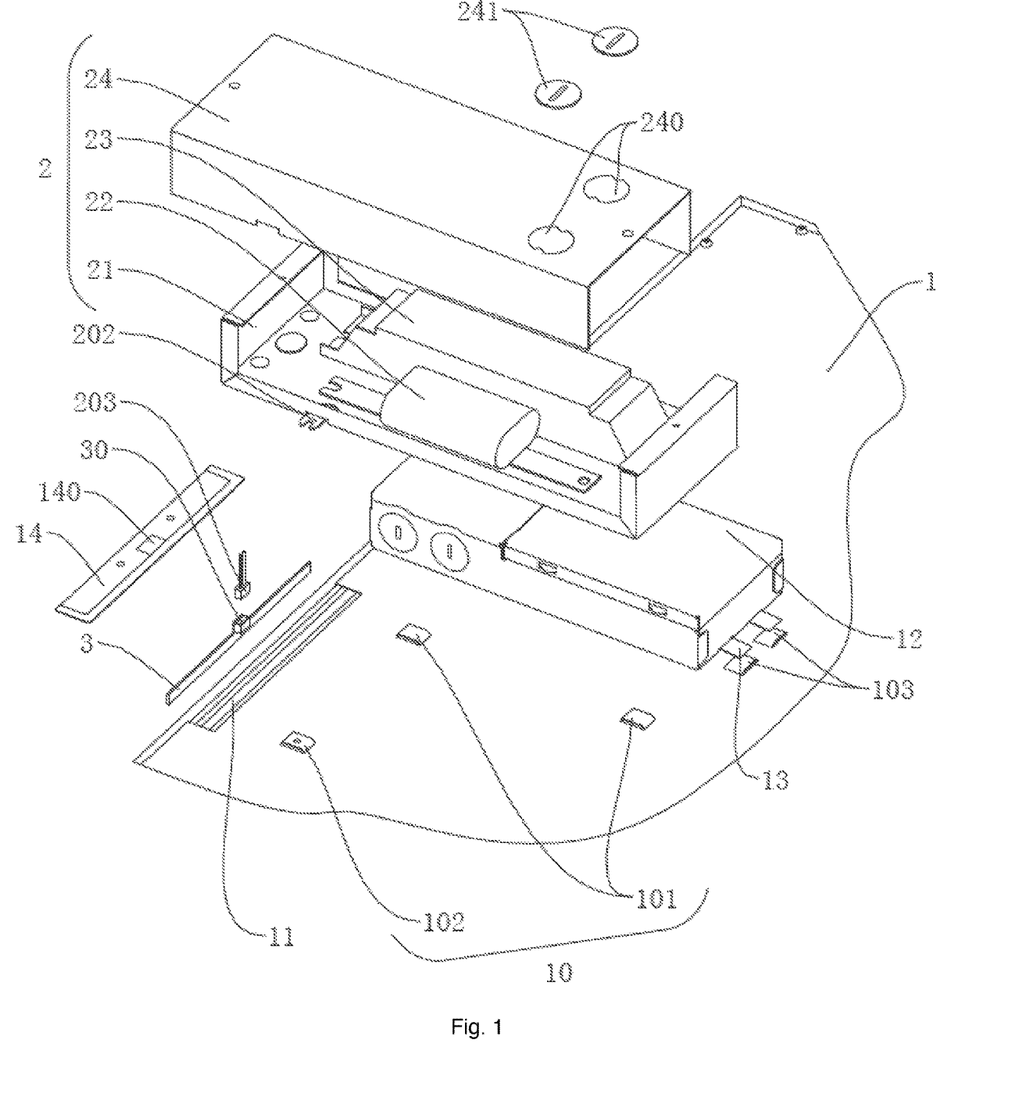
FIG. 1 illustrates an exploded view of a panel light embodiment.

FIG. 1 illustrates an example. In FIG. 1, there is a driver box 12 that has a driver box attaching to a back cover 1 of a panel light device.

There are slots for plugging protruding blocks of the driver box 12 for fixing the driver box 12 to the back cover 1. The emergency light module 2 has a base container 21 disposed with a battery 22 and an emergency driver circuit 23. There is a top cover 24 for protecting the battery 22 and the emergency driver circuit 23.

There are two wiring holes 240 covered by concealing covers 241. The wiring holes 240 are used for connecting wires to external power source to charge the battery 22 in normal time.

There is a concealing cover 14 that conceals an entrance 11 for inserting a second LED module 3 for emitting an emergency light. There is a plugging structure 30, e.g. a plugging electrode or an electrode socket for receiving power from the emergency driver circuit 23 or the battery 22. A corresponding plugging structure 203 passing through the through hole 140 is used for electrically connecting to the emergency driver circuit 23 of the emergency light module 2.

The fixing block 102 and the slots 101 are used as a fixing structure for detachably installing the emergency light module 2.

Figure 2:
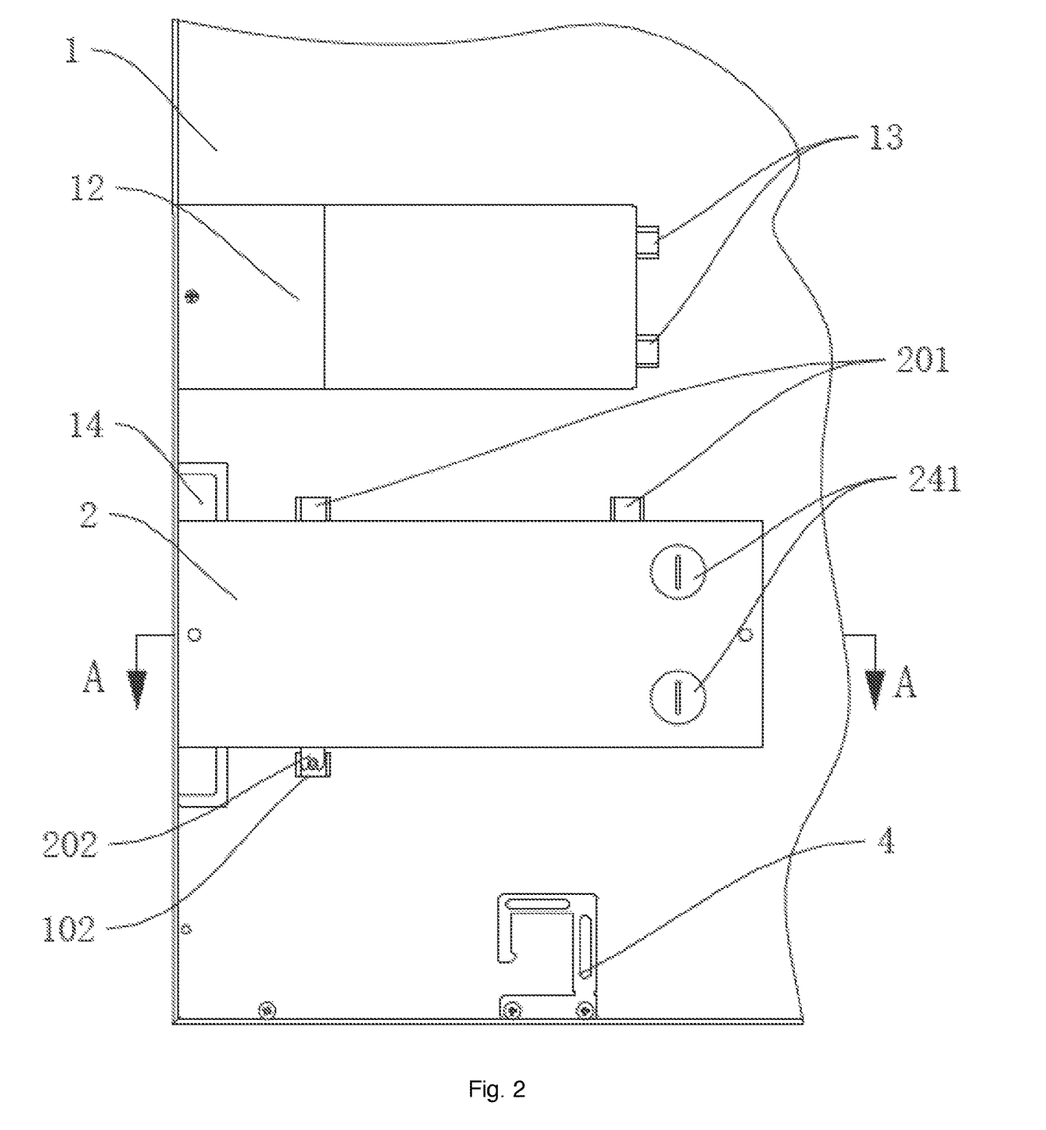
FIG. 2 illustrates a top view of the example in FIG. 1.

FIG. 2 shows a top view of the example of FIG. 1. The same reference numerals refer to the same components and not repeated again for brevity.

There is a hook 4 for fixing the panel light device to a ceiling installation base. There is an ear structure 202 for inserting to the fixing block 102.

Figure 3:
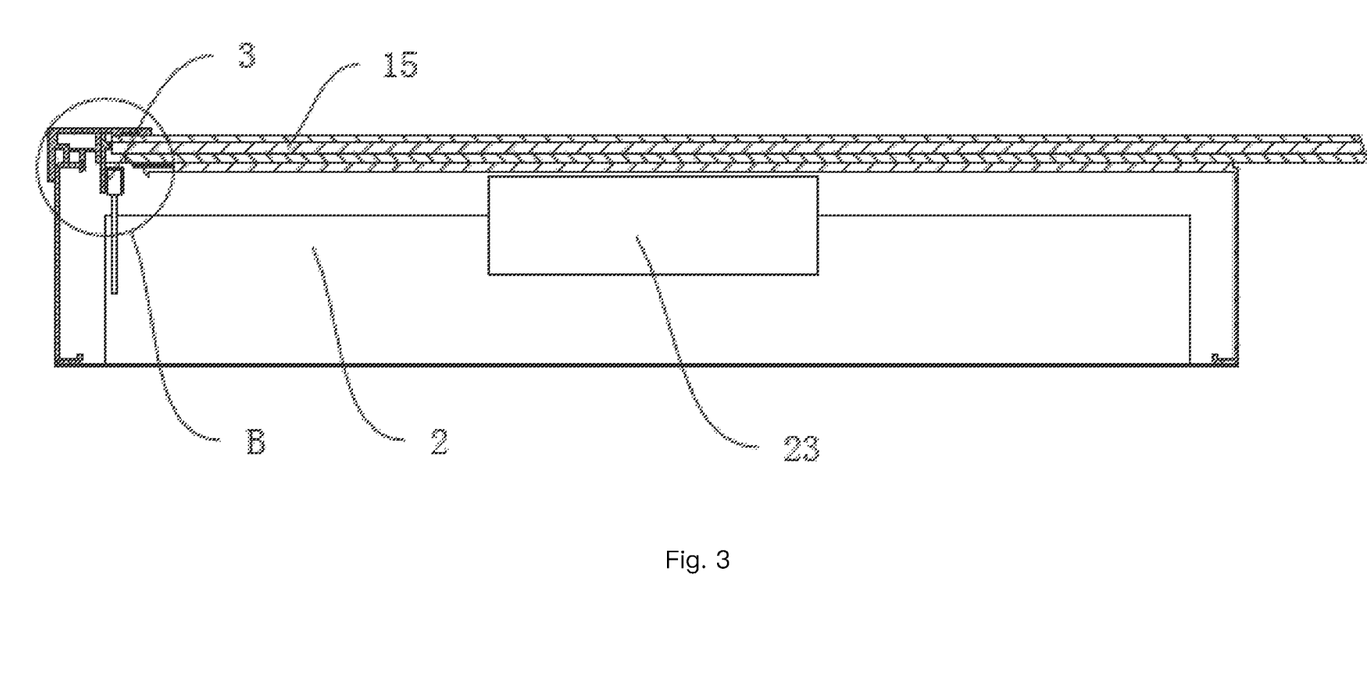
FIG. 3 illustrates a side view of the example in FIG. 1.

FIG. 3 shows a cross-sectional view of the example of FIG. 1. The same reference numerals refer to the same components and not repeated again for brevity. There is a light guide plate 15 used by the second LED module 3.

Figure 4:
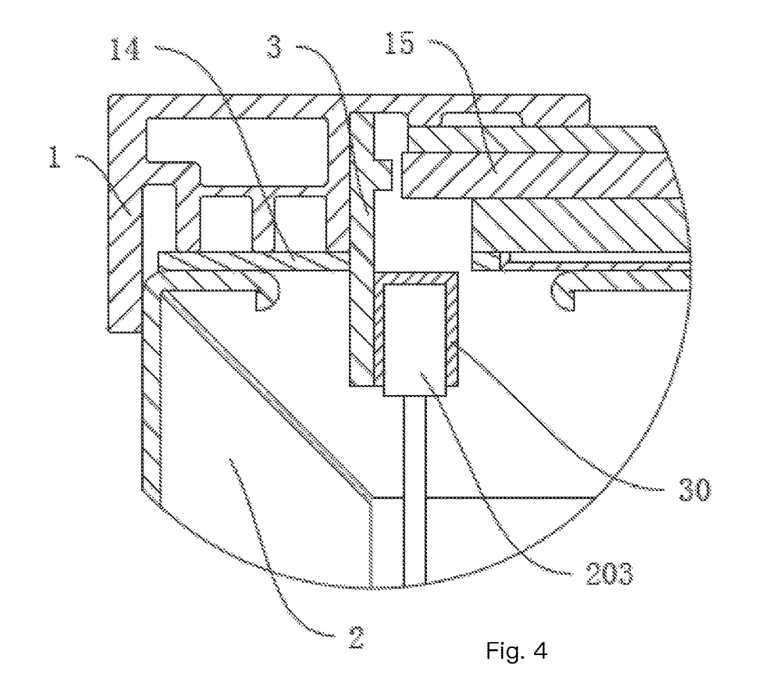
FIG. 4 illustrates a zoom-up cross-sectional view of components in an embodiment.

FIG. 4 shows a zoom-up view of a detail example for the example of FIG. 1. The same reference numerals refer to the same components and not repeated again for brevity.

Figure 5:
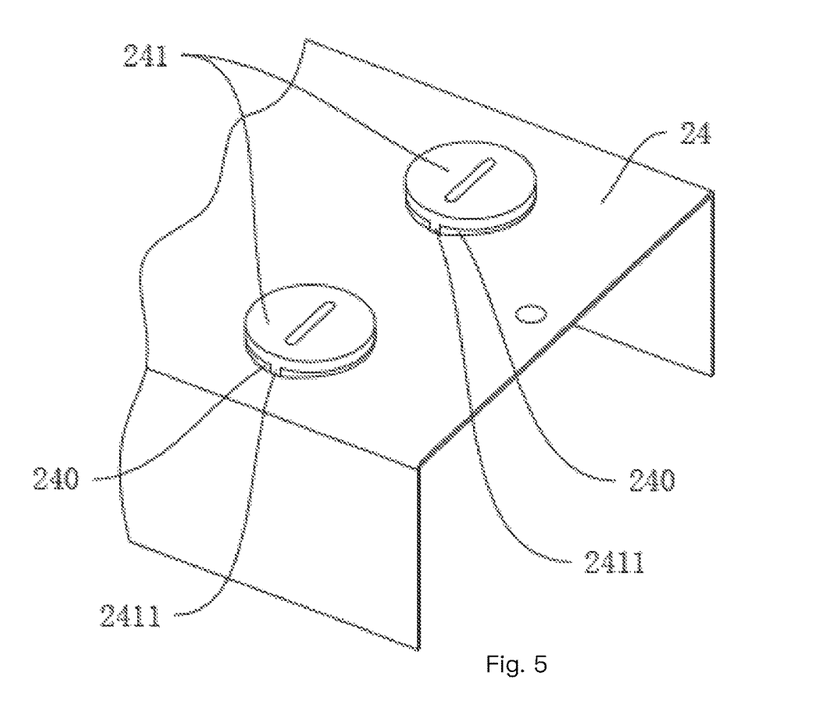
FIG. 5 illustrates a wiring hole structure for the emergency light module example.

FIG. 5 shows the structure of the top cover 24. The concealing covers 241 connect to the top cover 24 with connecting rims 2411. The concealing covers 241 may be detached from the top cover 24 and then recovered to the same position to prevent dust enter the box.

Figure 6:
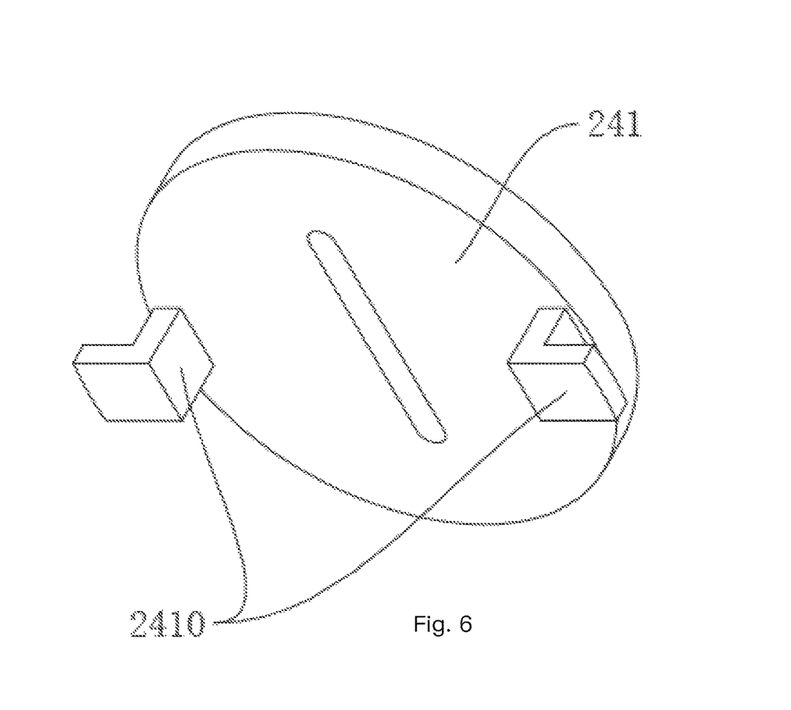
FIG. 6 illustrates a wiring cover component example.

FIG. 6 shows the connecting rims 2411 that are flexible to deform to conceal the wiring holes.

Figure 7:
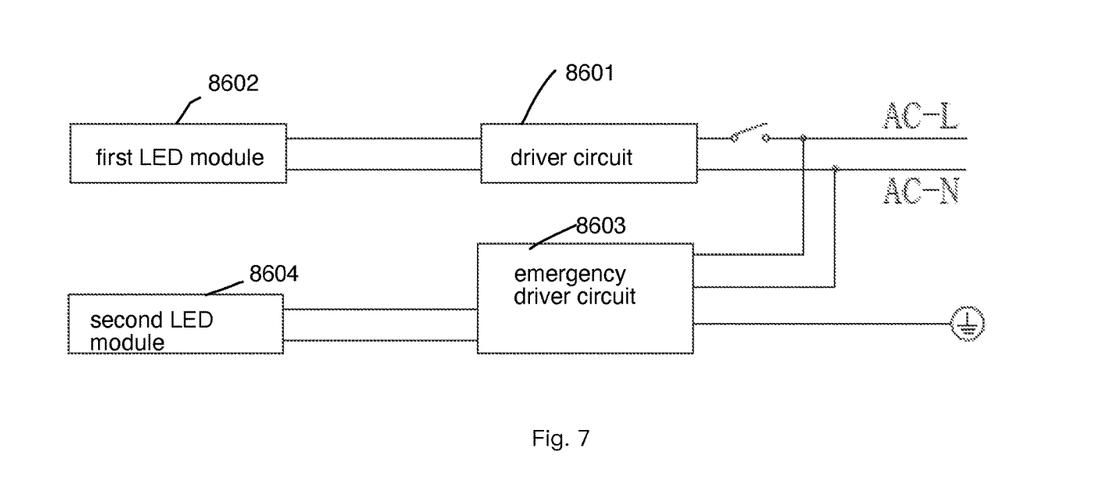
FIG. 7 illustrates a circuit diagram on power routing.1

FIG. 7 shows a circuit diagram for an example. The driver circuit 8601 converts an external power source from AC-L and AC-N power lines to a driving current to the first LED module 8602 of the first light source.

The emergency driver circuit 8603 also connects to the external power source and charges the battery. When in emergency condition, the battery provides power to the second LED module 8604.

In some embodiments, the emergency light module has its own second LED module with power supply directly from a battery of the emergency light module.

In some embodiments, the electrical connector is connected to the driver circuit in the driver box.

The cooperation between the driver circuit and the components like another power driver and/or a battery has several options depending on different design needs.

For example, the emergency light module only has a battery which is electrically connected to the driver circuit. In such case, the charging and discharging or power supply of the battery is controlled by the driver circuit. When there is no external power source supplied, the battery supplies power for the driver circuit to operate.

In some other embodiments, the emergency light module has its own power circuit also directly connected to the external power source and may be operated independent from the driver circuit and the first light source.

In some other embodiments, the emergency light module may have other ways to work with the first light source and some examples are provided in more detail in following description.

The emergency condition may be configured to associate for an accident stop of the external power, e.g. an indoor 110V/220V power supply.

In some embodiments, the function interface has a socket and a holder.

The holder is for holding a detachable battery module electrically plugged to the socket for supplying power to emit the emergency light.

The socket may be a common interface for receiving power supply. For example, USB interface is convenient for receiving power from a portable battery module, which is commonly seen and used in daily life for charging mobile phones.

With such socket, like USB interface and a holder, when emergency case like earthquake occurs, users may plug their portable battery module to the socket and place the portable battery module in the holder to provide temporary illumination.

In some embodiments, the lighting apparatus may also include a manual switch for selecting an emergency mode from multiple candidate emergency modes.

The multiple candidate emergency modes are corresponding to different time periods and light intensities of the emergency light.

There are various scenarios for an accident that needs emergency light. In some cases, the external power supply is expected to be quickly recovered while in some other cases, users may wait for quite a long time in a dark room if the emergency light is not available.

In FIG. 8, there is a manual switch 8851 to be operated by the user to select from multiple options. Each option is associated with a different light intensity and/or expected time period length for using the emergency light.

The circuit of the emergency light supply detects the status of the manual switch and determines a corresponding light intensity of the emergency light.

For example, when the time period is expected for 4 hours, the circuit calculates the estimated time period of the battery to supply an emergency light trying to be close to 4 hours. The light intensity is different from the option for 1 hour.

In some embodiments, the emergency light module includes a second LED module with a different color temperature as a first LED module of the first light source.

The driver circuit uses the second LED module and the first LED module to mix a mixed light not in the emergence condition.

When the emergency light module includes an additional LED module, the additional LED module may be operated together with the first light source to generate a more flexible light output, e.g. to mix a desired color temperature.

In other words, even not in the emergency condition, the second LED module of the emergency light module may still be used for providing common light output or even enhance the light output.

In FIG. 8, the function interface has a rotatable container for containing the emergency light module, e.g. via a rotating shaft 8852.

The rotatable container is rotated to insert the emergency light module.

Specifically, the lighting apparatus may have a rotatable box. The rotatable box has an entrance for inserting the emergency light module and kept not seen by people, e.g. placed upwardly toward the ceiling.

When users want to insert the emergency light module, users rotate the rotatable container, exposing the entrance downwardly and insert the detachable emergency light module.

After the emergency light module is inserted, the rotatable container is rotated back to its original position to keep the overall look of the lighting apparatus clean and elegant.

Figure 11:
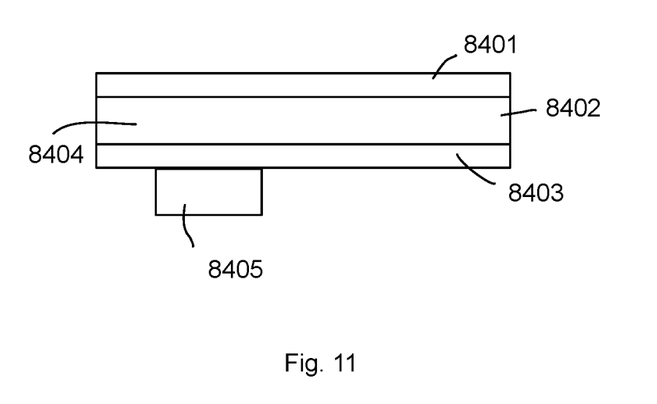
FIG. 11 shows a side view of a panel light device.

In FIG. 11, the light housing has a frame 8402, a back cover 8403 and a light passing cover 8401.

The frame 8402 connects the back cover 8403 and the light passing cover 8401 forming a container space 8404 for enclosing the first light source.

The driver box 8405 is attached on the back cover 8403.

In some embodiments, the lighting apparatus is a panel light device.

The panel light device has a frame. If the panel light device is a circular light shape, the frame is a circular wall. If the panel light is rectangular light shape, the frame has four lateral walls.

There is a back cover and a light passing cover connected to the frame on two sides forming a container space for disposing the first light source.

The light of the first light source is emitted passing through the light passing cover.

The driver box is attached on the back cover.

In some embodiments, the lighting apparatus may also include a light guide plate for receiving and guiding the light of the first light source to pass through the light guide plate.

A second LED module of the emergency light module emits the emergency light is also guided and passes through the light guide plate.

The light guide plate may be made of transparent material with a lateral wall as light entrance and a flat surface with a lot of micro structures where light escape from.

By using a light guide plate, a soft surface illumination is obtained.

The second LED module also uses the same light guide plate to change output light paths.

In some embodiments, the light housing has an entrance slot for inserting the second LED module of the emergency light module to align with a second light entrance position of the light guide plate.

In such example, the emergency light module has the second LED module.

The second LED module may be made as a module together with an emergency driver box. In some other cases, the second LED module is made as a detachable component from the emergency driver box.

The second LED module may be inserted into the light housing just like the first light source. When there is a light guide plate, the second LED module is aligned with the light entrance of the light guide plate.

In some embodiments, the first light source is aligned with a first light entrance position of the light guide plate.

The first light entrance position and the second light entrance position are located at different lateral sides of the light guide plate.

In some embodiments, the emergency light module includes an emergency power circuit supplying power to the first light source to emit the emergency light in the emergency condition.

In some embodiments, the first light source includes a first LED module emitting light not in the emergency condition and includes a second LED module used for generating the emergency light.

In some embodiments, the function interface includes a fixing structure for detachably fixing an emergency box of the emergency light module.

For example, a groove, a slot, a block, an ear structure with screws may be used as such fixing structure.

In some embodiments, a battery in the emergency box is electrically connected to the driver circuit when the emergency box is fixed to the fixing structure of the function interface.

In some embodiments, a concealing cover is used for covering a function slot of the function interface when the emergency module is not installed.

Such concealing cover may keep the appearance of the lighting apparatus elegant and prevent dust to enter the light housing.

In some embodiments, the concealing cover is open for inserting a second LED module into the light housing.

The second LED module has a first plugging structure for detachably connecting to a corresponding second plugging structure of the emergency box.

In some embodiments, the driver circuit controls a battery of the emergency light module to supply power to emit the emergency light in a discharging mode to discharge and test the battery to keep the battery in healthy condition.

The discharging mode is not in the emergency condition.

In some embodiments, the driver circuit controls a light intensity of the first light source so that a final light outputs from the light opening are substantially the same in the discharging mode and in a normal mode.

The normal mode is not the discharging mode and not in the emergency condition.

In some embodiments, the emergency light module has a power circuit electrically connected to the external power directly without passing via the driver circuit, and is automatically activated to emit the emergency light when the external power is not supplied.

In some embodiments, the function interface is detachably connected to a wireless module for receiving an external command from an external device to control the driver circuit.

In some embodiments, the function interface is detachably connected to a speaker module, the driver circuit supplies power to the speaker module to generate a sound.

In some embodiments, the first light source has an indicator for showing a battery status of the emergency light module when not in the emergency mode.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:
a first light source including a first LED module with a first color temperature;
a light housing for disposing the first light source, wherein the light housing has a light opening for a light of the first light source to pass through;
a driver having a driver box and a driver circuit, wherein the driver box is attached to the light housing, the driver circuit is connected to an external power and converts the external power to a driving current supplied to the first light source;
an emergency light module for providing an emergency light under an emergency condition, the emergency light module including a second LED module with a second color temperature different from the first color temperature; and
a function interface disposed on the light housing for selectively activating the emergency light module when under the emergency condition,
wherein the driver circuit activates the first LED module and the second LED module to produce a mixed light when not in the emergency condition.

2. The lighting apparatus of claim 1, wherein the function interface has a socket and a holder, the holder is for holding a detachable battery module electrically plugged to the socket for supplying power to emit the emergency light.

3. The lighting apparatus of claim 1, further comprising a manual switch for selecting an emergency mode from multiple candidate emergency modes, wherein the multiple candidate emergency modes are corresponding to different time periods and light intensities of the emergency light.

4. The lighting apparatus of claim 1, wherein the first light source has an indicator for showing a battery status of the emergency light module when not in the emergency mode.

5. The lighting apparatus of claim 1, wherein the light housing has a frame, a back cover and a light passing cover, the frame connects the back cover and the light passing cover to form a container space for enclosing the first light source, the driver box is attached on the back cover.

6. The lighting apparatus of claim 5, wherein the emergency light module comprises an emergency power circuit supplying power to the first light source to emit the emergency light in the emergency condition.

7. The lighting apparatus of claim 5, wherein the first light source comprises a first LED module emitting light not in the emergency condition and comprises a second LED module used for generating the emergency light.

8. The lighting apparatus of claim 5, wherein the emergency light module has a power circuit electrically connected to the external power directly without passing via the driver circuit, and is automatically activated to emit the emergency light when the external power is not supplied.

9. The lighting apparatus of claim 5, wherein the driver circuit controls a battery of the emergency light module to supply power to emit the emergency light in a discharging mode to discharge and test the battery to keep the battery in healthy condition, the discharging mode is not in the emergency condition.

10. The lighting apparatus of claim 9, wherein the driver circuit controls a light intensity of the first light source such that the light output is substantially the same in the discharging mode and in a normal mode not under the emergency condition.

11. The lighting apparatus of claim 5, further comprising a light guide plate for receiving and guiding the light of the first light source to pass through the light guide plate, wherein the emergency light module emits the emergency light and which is also guided and passes through the light guide plate.

12. The lighting apparatus of claim 11, wherein the light housing has an entrance slot for inserting the second LED module of the emergency light module to align with a second light entrance position of the light guide plate.

13. The lighting apparatus of claim 11, wherein the first light source is aligned with a first light entrance position of the light guide plate, the first light entrance position and the second light entrance position are located at different lateral sides of the light guide plate.

14. The lighting apparatus of claim 5, wherein the function interface comprises a fixing structures for detachably fixing an emergency box of the emergency light module.

15. The lighting apparatus of claim 14, wherein a battery in the emergency box is electrically connected to the driver circuit when the emergency box is fixed to the fixing structure of the function interface.

16. The lighting apparatus of claim 14, wherein a concealing cover is used for covering a function slot of the function interface when the emergency module is not installed.

17. The lighting apparatus of claim 16, wherein the concealing cover is open for inserting a second LED module into the light housing, the second LED module has a first plugging structure for detachably connecting to a corresponding second plugging structure of the emergency box.

* * * * *